US012579343B2

(12) United States Patent (10) Patent No.: US 12,579,343 B2
Chung et al. (45) Date of Patent: Mar. 17, 2026

(54) WAFER DEFECT PREDICTION DEVICE AND OPERATING METHOD THEREOF

(71) Applicant: Samsung Electronics Co., Ltd., Suwon-si (KR)

(72) Inventors: Bumsuk Chung, Hwaseong-si (KR); Hakgyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1231 days.

(21) Appl. No.: 17/466,343

(22) Filed: Sep. 3, 2021

(65) Prior Publication Data

US 2022/0207216 A1 Jun. 30, 2022

(30) Foreign Application Priority Data

Dec. 31, 2020 (KR) ........................ 10-2020-0189860

(51) Int. Cl.
 *G06F 30/27* (2020.01)
 *G06F 111/08* (2020.01)
(52) U.S. Cl.
 CPC .......... *G06F 30/27* (2020.01); *G06F 2111/08* (2020.01)
(58) Field of Classification Search
 CPC .................................................... G06F 30/27
 See application file for complete search history.

(56) References Cited

U.S. PATENT DOCUMENTS

| | | | |
|---|---|---|---|
| 7,579,859 B2 | 8/2009 | Liao et al. | |
| 8,053,257 B2 | 11/2011 | Chanda et al. | |
| 9,026,981 B2 | 5/2015 | Li et al. | |
| 9,287,185 B1 | 3/2016 | Bonilla et al. | |
| 2006/0115910 A1 | 6/2006 | Okada | |
| 2007/0185683 A1* | 8/2007 | Foo ................... | G05B 19/41875 |
| | | | 702/181 |

FOREIGN PATENT DOCUMENTS

JP 5636886 B2 12/2014

OTHER PUBLICATIONS

Barnett (T. S. Barnett, M. Grady, K. G. Purdy and A. D. Singh, "Combining negative binomial and Weibull distributions for yield and reliability prediction," in IEEE Design & Test of Computers, vol. 23, No. 2, pp. 110-116, Mar.-Apr. 2006, doi: 10.1109/MDT. 2006.38.) (Year: 2006).*
Joshi (K. Joshi et al., "A Statistical Learning Model for Accurate Prediction of Time-Dependent Dielectric Degradation for Low Failure Rates," 2019 IEEE International Reliability Physics Symposium (IRPS), Monterey, CA, USA, 2019, pp. 1-6, doi: 10.1109/ IRPS.2019.8720424.) (Year: 2019).*

(Continued)

*Primary Examiner* — Bijan Mapar
(74) *Attorney, Agent, or Firm* — Wolf, Greenfield & Sacks, P.C.

(57) ABSTRACT

A method of predicting wafer defect information includes estimating a distribution with respect to defect occurrence time data, the defect occurrence time data including information about a time associated with a wafer defect occurrence, distinguishing a defect distribution type according to a result of the estimating the distribution, and outputting wafer defect information predicted according to the distinguished defect distribution type.

20 Claims, 16 Drawing Sheets

(56)     References Cited

OTHER PUBLICATIONS

Heller (R. D. Heller, "Near neighbor sort yield and wafer sort yield impact on product burn-in and a time dependent reliability study," 2016 IEEE International Reliability Physics Symposium (IRPS), Pasadena, CA, USA, 2016, pp. PR-2-1-PR-2-4, doi: 10.1109/IRPS. 2016.7574631.) (Year: 2016).*

T. Hauck, et al, "Weibull statistics for multiple flaw distributions and its application in silicon fracture prediction," EuroSimE 2005. Proceedings of the 6th International Conference on Thermal, Mechanial and Multi-Physics Simulation and Experiments in Micro-Electronics and Micro-Systems, 2005. (Year: 2005).*

* cited by examiner

FIG. 12

| | | X value | | | | | | | | | | | | y value | |
|---|---|---|---|---|---|---|---|---|---|---|---|---|---|---|---|
| | | $\alpha_1$ | $\alpha_2$ | $\alpha_3$ | $\beta_1$ | $\beta_2$ | $\beta_3$ | $\lambda_1$ | $\lambda_2$ | $\lambda_3$ | L.L.1 | L.L.2 | L.L.3 | Whether a defect occurs | extrinsic defect rate |
| $W_1$ | | 6123 | 4155 | 6222 | 20.48 | 3.40 | 4.25 | 0.11 | 0.66 | 0.22 | −15.02 | −43.51 | −22.11 | T | 200ppm |
| $W_i$ | | 5614 | 3590 | 6373 | 3.11 | 3.23 | 4.48 | 0.17 | 0.55 | 0.28 | −13.55 | −42.35 | −22.52 | F | 0ppm |
| ⋮ | | | | | | | | ⋮ | | | | | | ⋮ | |
| $W_{n-1}$ | | 4623 | 3522 | 5634 | 9.06 | 4.56 | 7.68 | 0.10 | 0.79 | 0.11 | −16.82 | −39.83 | −23.84 | T | 500ppm |
| $W_n$ | | 4549 | 4829 | 6080 | 2.46 | 4.50 | 6.67 | 0.12 | 0.56 | 0.32 | −18.08 | −48.72 | −21.83 | F | 0ppm |

FIG. 13

| PERCENTAGE (%) | PERCENTILE (YEAR) | STANDARD ERROR | 95% CONFIDENCE INTERVAL | |
|---|---|---|---|---|
| | | | LOWER LIMIT | UPPER LIMIT |
| 0.00001 | 108.44 | 52.86 | 41.72 | 281.89 |
| 0.0001 | 211.05 | 88.65 | 92.65 | 480.75 |
| 0.001 | 410.74 | 144.89 | 205.73 | 820.04 |
| 0.01 | 799.38 | 228.34 | 456.68 | 1399.24 |
| 0.1 | 1555.94 | 340.47 | 4013.29 | 2389.18 |
| 1 | 3032.08 | 462.64 | 2248.34 | 4089.01 |
| ... | | | | |

WAFER DEFECT PREDICTION DEVICE AND OPERATING METHOD THEREOF

CROSS-REFERENCE TO RELATED APPLICATION

This application is based on and claims priority under 35 U.S.C. § 119 to Korean Patent Application No. 10-2020-0189860, filed on Dec. 31, 2020, in the Korean Intellectual Property Office, the disclosure of which is incorporated by reference herein in its entirety.

BACKGROUND

Inventive concepts relate to a device for predicting a wafer defect, and more particularly, to a device for predicting a wafer defect for each life distribution type and/or an operating method thereof.

When a low voltage is continuously applied to a semiconductor device, in particular, to a metal oxide silicon field emission transistor (MOSFET), a gate oxide film is deteriorated and may eventually be destroyed. Accordingly, such a semiconductor defect may be referred to as a time dependent dielectric breakdown (TDDB). When a TDDB defect occurs, as a leakage current that passes through a gate oxide film is generated, the MOSFET may not be normally turned off. This may result in a defect, leading to malfunction of an entire semiconductor product.

SUMMARY

Inventive concepts provide a method of classifying a defect distribution type for each life distribution type in a TDDB defect, and predicting a wafer defect corresponding to each defect distribution type.

According to some example embodiments inventive concepts, there is provided a method of predicting wafer defect information which includes estimating a distribution with respect to defect occurrence time data, the defect occurrence time data including information about a time associated with a wafer defect occurrence, distinguishing a defect distribution type according to a result of the estimating the distribution, and outputting wafer defect information predicted according to the distinguished defect distribution type.

According to an aspect of inventive concepts, there is provided a method of predicting wafer defect information which includes estimating a distribution with respect to defect occurrence time data including information about a time associated with an occurrence of the wafer defect, distinguishing a defect distribution type according to a distribution estimation result, and outputting the wafer defect information by using a wafer defect prediction model according to the distinguished defect distribution type.

According to an aspect of inventive concepts, there is provided a device for predicting wafer defect information includes processing circuitry configured to estimate a distribution with respect to defect occurrence time data including information about a time when a wafer defect occurs, to distinguish a defect distribution type according to a distribution estimation result and output wafer defect information predicted according to a distinguished defect distribution type, and to classify a grade of a wafer based on the wafer defect information.

BRIEF DESCRIPTION OF THE DRAWINGS

Some example embodiments of inventive concepts will be more clearly understood from the following detailed description taken in conjunction with the accompanying drawings in which:

FIG. 12 illustrates an example of training data of the machine learning unit of FIG. 1; and FIG. 13 is a table showing an example of a method of predicting a wafer defect based on lifetime.

DETAILED DESCRIPTION OF SOME EXAMPLE EMBODIMENTS

Hereinafter, some example embodiments of inventive concepts are described below in detail with reference to the accompanying drawings.

Figure 1:
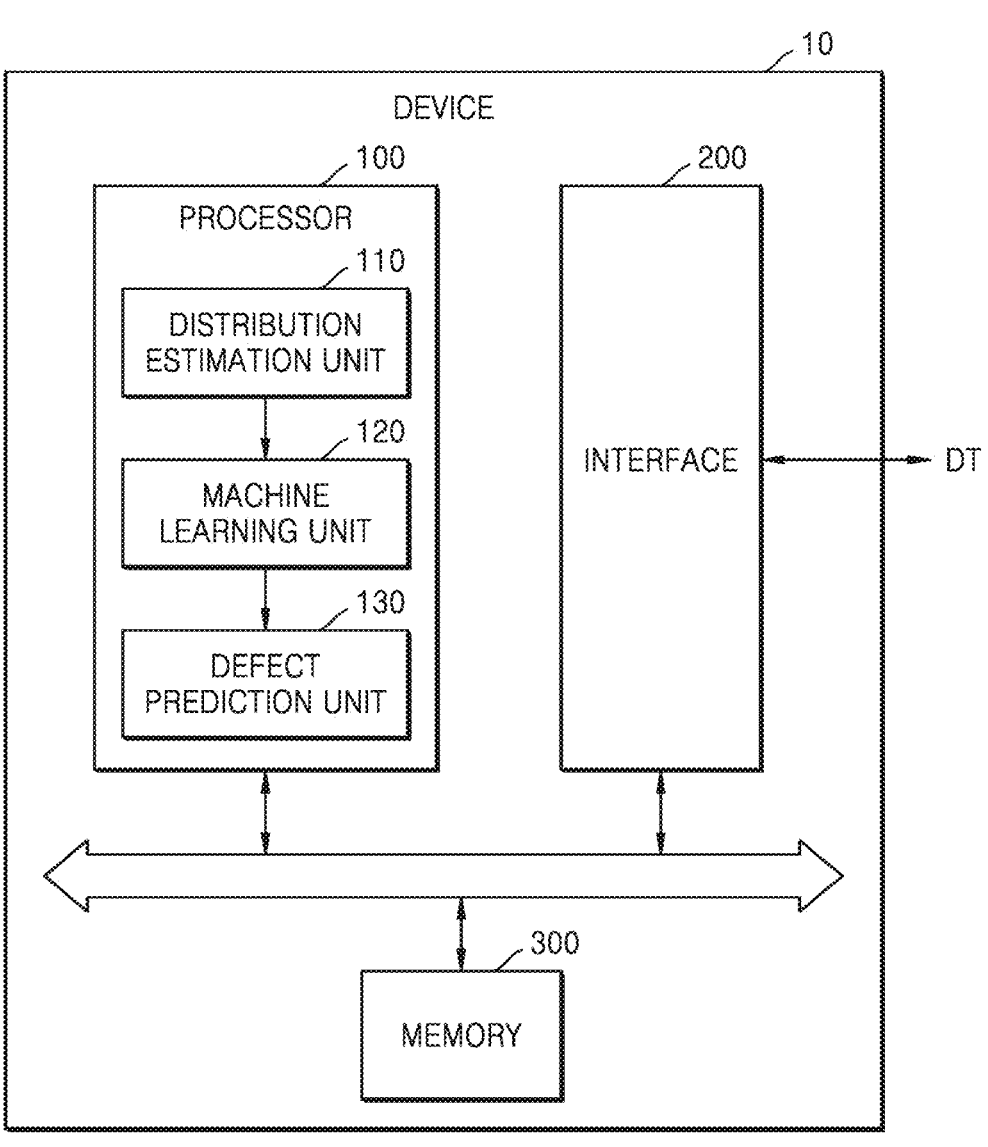
FIG. 1 is a block diagram of a device for predicting a wafer defect according to some example embodiments of inventive concepts.

FIG. 1 is a block diagram of a device 10 for predicting a wafer defect according to some example embodiments of inventive concepts.

Referring to FIG. 1, the device 10 for predicting a wafer defect may include a processor 100, an interface 200, and a memory 300. The processor 100 may transmit and receive data DT with respect to an external device (not shown) through the interface 200. For example, the processor 100 may predict a wafer defect by loading data received from the interface 200 and data stored in the memory 300.

The processor 100 according to some example embodiments of inventive concepts may include a distribution estimation unit 110, a machine learning unit 120, and a defect prediction unit 130. The distribution estimation unit 110 may divide defect occurrence time data into a plurality of distributions based on a goodness of fit between a distribution of defect occurrence time data and a probability distribution of a first type. The first type may be preset type; however, example embodiments are not limited thereto. The distribution estimation unit may output the probability distribution of a preset type corresponding to each of the distributions. The machine learning unit 120 may receive a distribution estimation result from the distribution estimation unit 110, and generate a wafer defect prediction model based on the received distribution estimation result.

Although FIG. 1 illustrates that the processor includes separate units such as the distribution estimation unit 110, the machine learning unit 120, and the defect prediction unit 130 to perform different functions, this is for illustrative purposes only and example embodiments are not limited thereto. For example, some functions described as being performed by one unit may be performed by another unit. There may be a processor configured to execute machine-readable instructions to perform any of the functions described below; hence making the processor special purpose.

The defect prediction unit 130 may distinguish a defect distribution type by receiving the distribution estimation result from the distribution estimation unit 110, and may predict a defect of a wafer according to the distinguished defect distribution type. For example, the defect prediction unit 130 may output wafer defect information predicted based on at least one of an extrinsic defect rate or the lifetime according to the defect distribution type. Alternatively or additionally, the defect prediction unit 130 may predict an extrinsic defect rate from new input data by using the wafer defect prediction model generated by the machine learning unit 120.

The processor 100 may further include a grade classification unit (not shown). The grade classification unit may classify the grade of a wafer based on the wafer defect information output from the defect prediction unit 130.

The memory 300 may store various data needed or used for the operation of the processor 100. The memory 300 may be implemented by, for example, at least one of a dynamic random access memory (DRAM), mobile DRAM, static RAM (SRAM), phase change RAM (PRAM), ferroelectric RAM (FRAM), resistive RAM (RRAM and/or ReRAM), and/or magnetic RAM (MRAM).

Figure 2:
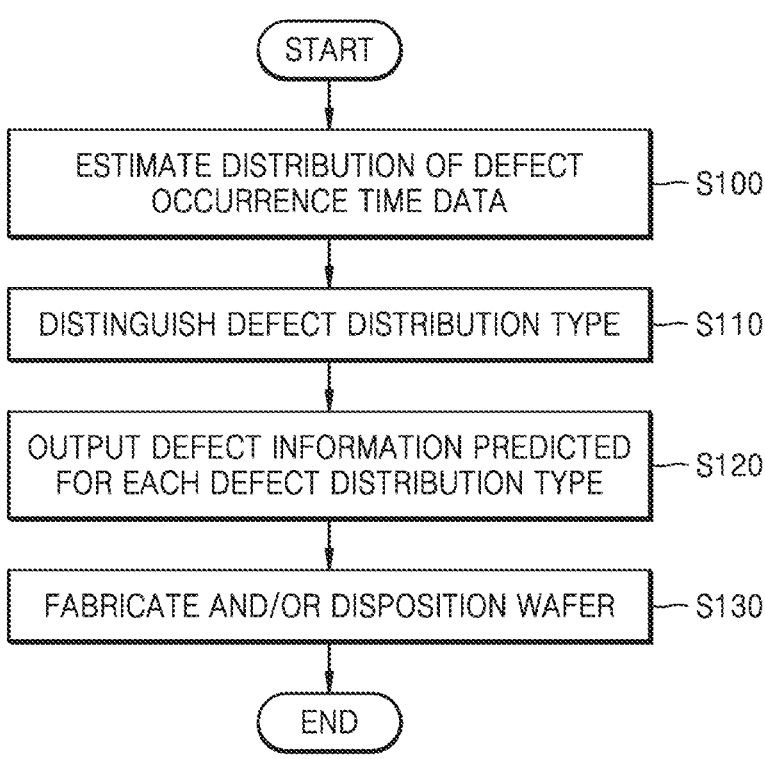
FIG. 2 is a flowchart of a method of predicting a wafer defect according to some example embodiments of inventive concepts.

FIG. 2 is a flowchart of a method of predicting a wafer defect according to some example embodiments of inventive concepts.

Referring to FIGS. 1 and 2, the processor 100 may collect defect occurrence time data including information about occurrence times of a wafer defect, e.g. may collect a time when a wafer defect occurs. The defect occurrence time data may be or may include data indicating a probability of accumulated failures according to a time when stress is applied to a wafer. For example, the processor 100 may receive defect occurrence time data from the external device through the interface 200. The memory 300 may store a plurality of pieces of defect occurrence time data, and may provide the stored defect occurrence time data to the processor 100 at the request of the processor 100.

The processor 100 may estimate a distribution of the collected defect occurrence time data (S100). The processor 100 according to some example embodiments of inventive concepts may divide a distribution of defect occurrence time data into k distributions, e.g. k separate and distinct distributions. Herein k is an integer greater than or equal to 1. The processor 100 may divide the distribution based on the goodness of fit (GoF) between a distribution of defect occurrence time data and a probability distribution. The probability distribution may be of a variable and/or of a preset type. The processor 100 may output the probability distribution corresponding to each of the k distributions.

The processor 100 may distinguish a defect distribution type from the distribution estimation result (S110). The processor 100 may distinguish a defect distribution type according to a k value or a k distribution form.

The processor 100 may output wafer defect information predicted based on the distinguished defect distribution type (S120). The processor 100 according to some example embodiments of inventive concepts may predict the lifetime when the defect occurrence time data follows some types of defect distribution types, and an extrinsic defect rate when the defect occurrence time data follows some other types of defect distributions.

Based on the output of defect information, a semiconductor device may be fabricated, and/or the wafer may be dispositioned (S130). For example, based on the predicted lifetime associated with a particular distinguished defect distribution type, the process conditions, such as oxide thicknesses and/or implant conditions, etc., used in semiconductor fabrication may be adjusted. Alternatively or additionally, semiconductor chips/die associated with the defect distribution type may be categorized and/or upgraded and/or downgraded based on the defect distribution type. For example, based on the defect information, some semiconductor devices may be recalled; alternatively, based on the defect information, some semiconductor devices may be provided to some customers but not to other customers. Alternatively or additionally, the wafer may be dispositioned based on the defect information output. For example, depending on the defect information output, the wafer may be graded and/or scrapped or upgraded and/or dispositioned to a particular product or application. Example embodiments are not limited thereto.

Figure 3:
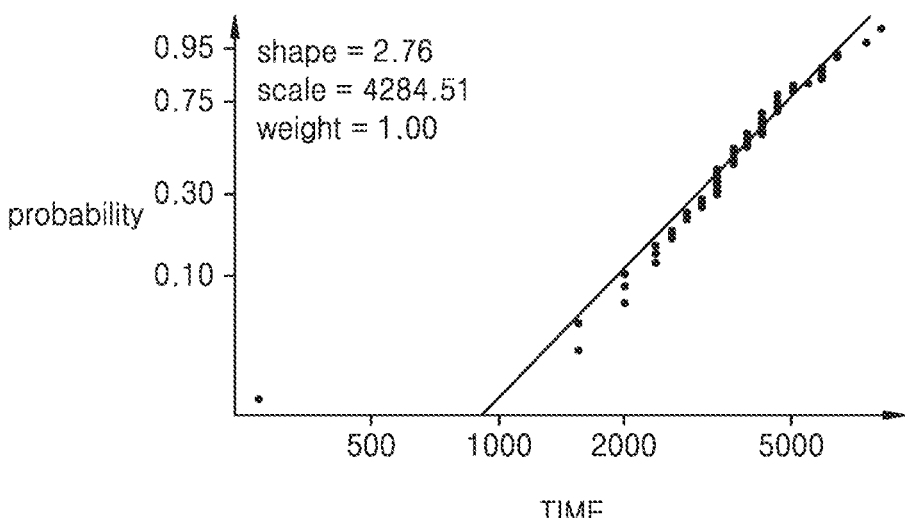
FIG. 3 is a graph of an example of matching defect occurrence time data to one Weibull distribution.

FIG. 3 is a graph of an example of matching defect occurrence time data to one, e.g. only one, Weibull distribution.

Referring to the graph of FIG. 3, dots in FIG. 3 indicate defect occurrence time data obtained through a reliability test, e.g. a reliability test performed on a wafer and/or performed on a packaged semiconductor device. In the graph, the x-axis denotes a stress application time (in arbitrary units), and the y-axis denotes an accumulated defect probability.

The conditions of the reliability test may be based on, e.g. may be accelerated by, at least one of temperature, humidity, or voltage. Furthermore a failure event may be associated with a TDDB failure; however, example embodiments are not limited thereto. For example, other failures may be considered, such as but not limited to, at least one of hot carrier injection (HCI), negative bias temperature instability (NBTI), positive bias temperature instability (PBTI), or channel initiated secondary electron (CHISEL) failures.

The processor 100 according to some example embodiments of inventive concepts may determine the goodness of fit (GoF) between a distribution of defect occurrence time data and a probability distribution, e.g. a preset or a provided probability distribution, and may divide the distribution of defect occurrence time data based on the goodness of fit. For example, the processor 100 may determine a goodness of fit between a distribution of defect occurrence time data and the Weibull distribution.

Example embodiments are not necessarily limited to a probability distribution being a Weibull distribution. For example, the probability distribution may be at least one of a generalized gamma distribution, an exponential distribution, a Rayleigh distribution, a bathtub distribution, an Erlang distribution, a gamma distribution, or a generalized extreme value distribution; however, example embodiments are not limited thereto.

When life data of a product is matched to a probability distribution, a Weibull distribution using two parameters may be used as expressed in Equation 1 below, which describes a probability density function (PDF). In Equation 1, $\lambda$, as a scale parameter, may denote a life centroid that about 63.2% of data following the Weibull distribution becomes defective. Additionally β, as a shape parameter, may denote a process distribution.

$$f(x; \lambda, \beta) = \frac{\beta}{\lambda} \left(\frac{x}{\lambda}\right)^{\beta-1} e^{-\left(\frac{x}{\lambda}\right)^{\beta}} \qquad \text{[Equation 1]}$$

A cumulative distribution function (CDF) to the Weibull distribution may be expressed as shown in Equation 2 below.

$$F(x) = 1 - e^{-\left(\frac{x}{\lambda}\right)^{\beta}} \qquad \text{[Equation 2]}$$

As illustrated in FIG. 3, the processor 100 may match the defect occurrence time data to one Weibull distribution. The estimated shape parameter of a Weibull distribution may indicate the gradient of a graph, e.g. may indicate a "slope" of a failure probability with respect to time. When other conditions are the same and the shape parameter decreases, a distribution of the entire data may increase. The estimated scale parameter of a Weibull distribution may indicate a relative location of a graph, e.g. may indicate an "intercept" location of a failure probability with respect to time. When other conditions are the same and the scale parameter increases, the entire graph may move right. According to example embodiments of FIG. 3, the shape parameter and the scale parameter to the defect occurrence time data may be 2.76 and 4284.51, respectively. These are illustrative examples only, and example embodiments are not limited thereto.

Figure 4:
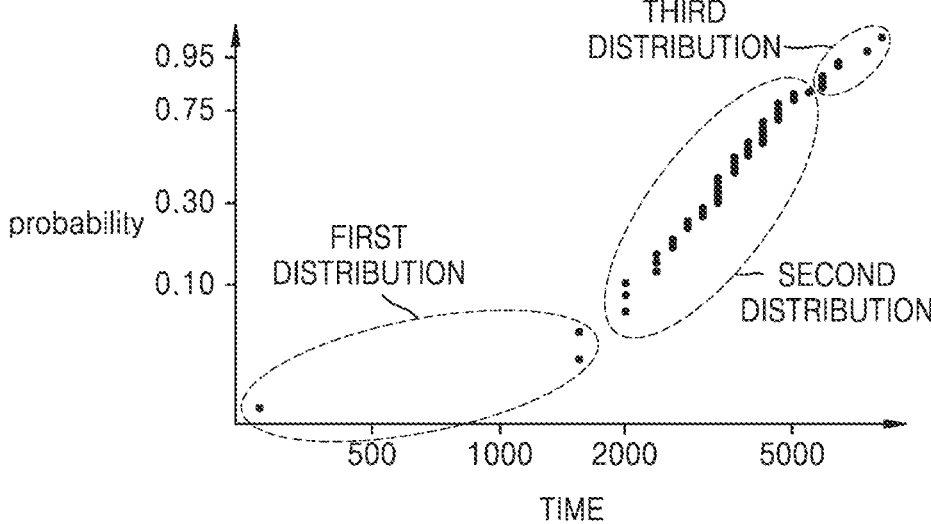
FIG. 4 is a graph of an example of dividing the defect occurrence time data of FIG. 3 into a plurality of groups according to defect characteristics.

FIG. 4 is a graph of an example of dividing the defect occurrence time data of FIG. 3 into a plurality of groups, according to defect characteristics.

Referring to FIG. 4, a distribution of defect occurrence time data may be divided into distributions based on an extrinsic defect, an intrinsic defect, and a robust intrinsic defect according to a defect occurrence time.

The extrinsic defect may be of a type generated due to a defect in a manufacturing process and/or design flaws. The extrinsic defect may also be associated with an infant or an early wear-out defect. The intrinsic defect may be of a type generated due, for example, to abrasion according to the use of a product and/or a flow of time, which occurs at a time when the life of a product almost ends. The robust intrinsic defect may be of a type generated after a certain time passes after the use of a product, which may be distinguished as a noise in a life distribution analysis.

Referring to FIG. 4, the defect occurrence time data may be classified into a number of distributions, such as into three distributions, according to defect characteristics. A first distribution may be a distribution indicating extrinsic defect characteristics, a second distribution may be a distribution indicating intrinsic defect characteristics, and a third distribution may be a distribution indicating robust intrinsic defect characteristics.

The device 10 for predicting a wafer defect according to some example embodiments of inventive concepts may identify characteristics for each wafer defect type by dividing the defect occurrence time data into a plurality of distributions representing defect characteristics, and particularly, provide a method of accurately predicting an extrinsic defect rate from a distribution representing the extrinsic defect characteristics.

Figure 5:
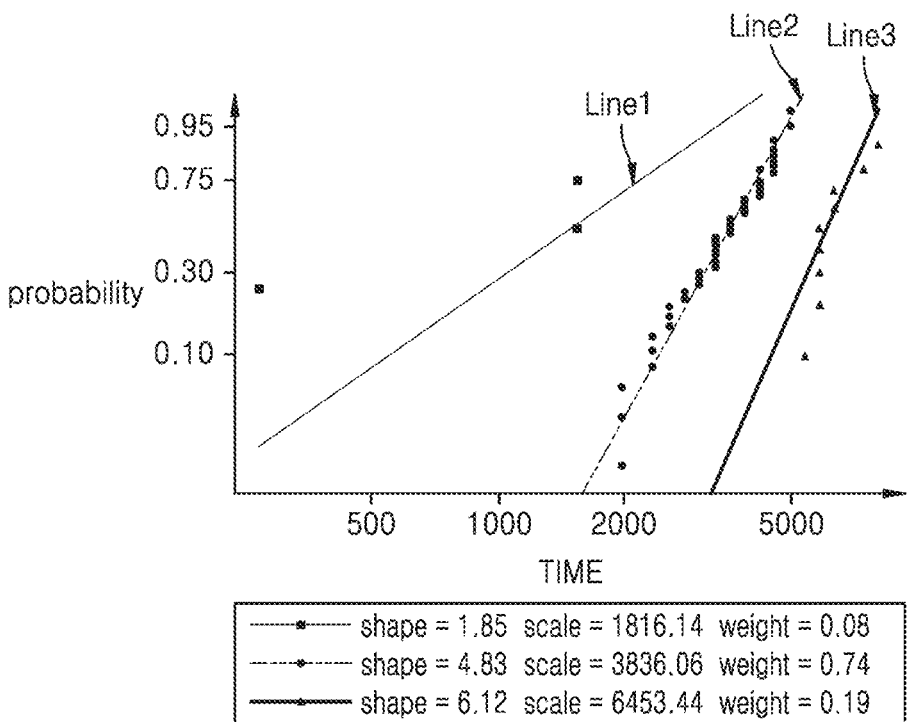
FIG. 5 is a graph of an example of dividing the defect occurrence time data of FIG. 3 into a plurality of groups and matching each of data included in the groups to a Weibull distribution.

FIG. 5 is a graph of an example of dividing the defect occurrence time data of FIG. 3 into a plurality of distributions and matching each of data included in the distributions to a Weibull distribution.

Referring to FIGS. 4 and 5 together, the processor 100 may match data included in the first distribution to one, e.g. one specific, Weibull distribution (Line 1). For example, the processor 100 may estimate a shape parameter and/or a scale parameter of the Weibull distribution (Line1) corresponding to the first distribution to be 1.85 and 1816.14, respectively. The processor 100 may match data included in the second distribution to one, e.g. one specific, Weibull distribution (Line 2). The processor 100 may estimate a shape parameter and/or a scale parameter of the Weibull distribution (Line2) corresponding to the second distribution to be 4.83 and 3836.06, respectively. The processor 100 may match data included in the third distribution to one Weibull distribution (Line3). The processor 100 may estimate a shape parameter and/or a scale parameter of the Weibull distribution (Line3) corresponding to the third distribution to be 6.12 and 6453.44, respectively.

As the shape parameter corresponding to the gradient of a Weibull distribution decreases, a possibility of being an extrinsic defect may increase. For example, the shape parameter value of an extrinsic defect type may be about 2 or less, the shape parameter value of an intrinsic defect type may be about 3 to 5, and the shape parameter value of a robust intrinsic defect type may be greater than the above values. However, these shape parameters are for illustrative purposes only, and example embodiments are not limited thereto.

Figure 6:
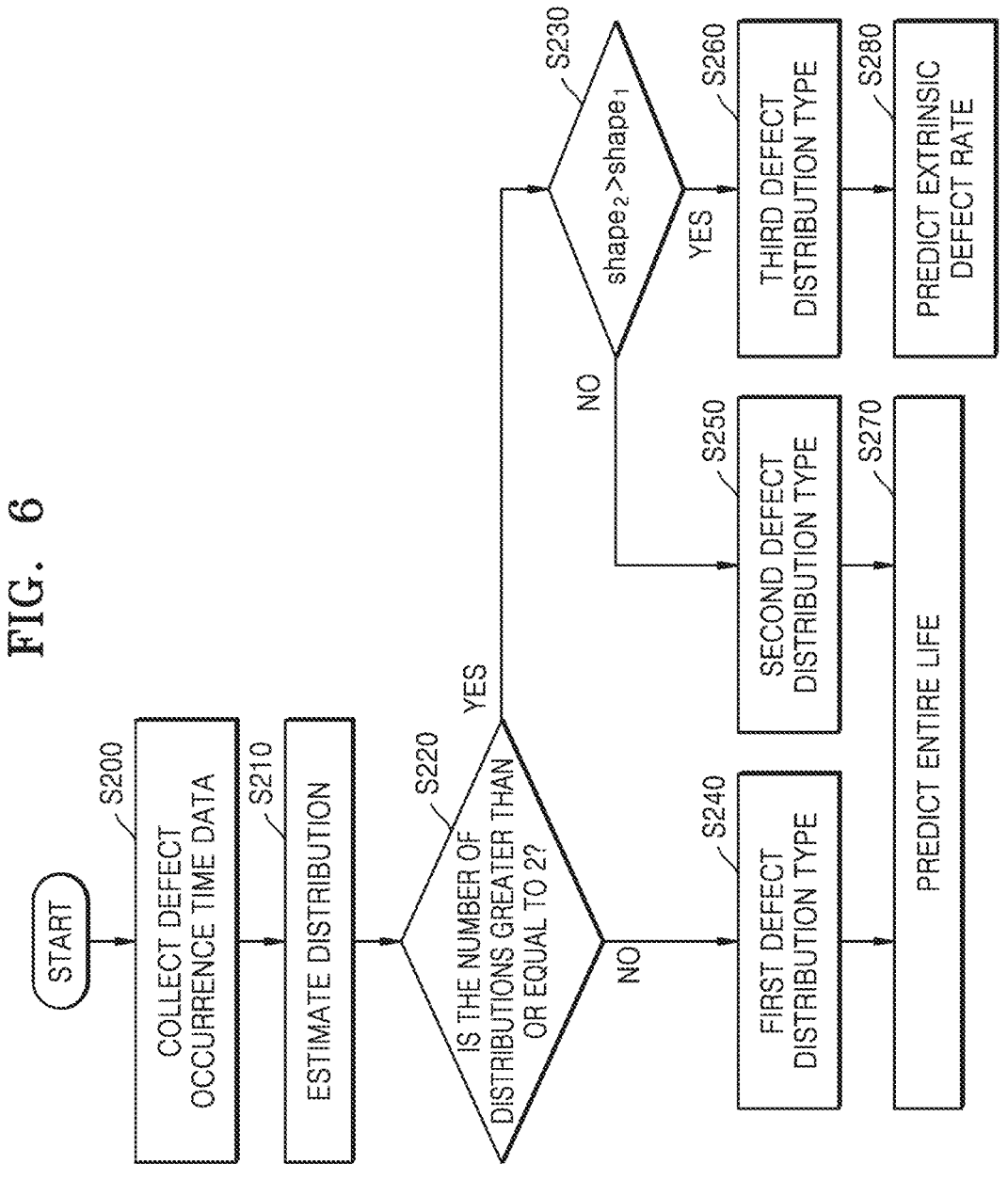
FIG. 6 is a flowchart of a method of predicting a wafer defect according to some example embodiments of inventive concepts.

FIG. 6 is a flowchart of a method of predicting a wafer defect according to some example embodiments of inventive concepts.

The processor 100 may collect wafer defect occurrence time data (S200). The defect occurrence time data may include information about accumulated defect probability according to a stress time.

The processor 100 may estimate a distribution of the collected defect occurrence time data (S210). The processor 100 may determine a goodness of fit (GoF) between a distribution of defect occurrence time data and a probability distribution of a variable and/or preset type, and may divide the defect occurrence time data into k distributions based on the goodness of fit. As illustrated in FIG. 4, the k distributions may indicate defect characteristics. The goodness of fit may be based on a root-mean-square estimation; however, example embodiments are not limited thereto.

The processor 100 according to some example embodiments may determine a case in which the goodness of fit between a distribution of defect occurrence time data and the Weibull distribution is large, e.g. is the highest among cases of classifying the defect occurrence time data into a plurality of distributions.

For example, the processor 100 may divide the defect occurrence time data into one, two, three, or more distributions, and in each case, may match each distribution to a Weibull distribution. In this state, when the defect occurrence time data is divided into three distributions and each distribution is matched to a Weibull distribution, the goodness of fit of the defect occurrence time data may be the highest. In this case, the Weibull distribution corresponding to each of the three distributions may be a distribution estimation result.

The processor 100 may distinguish a defect distribution type according to the number of distributions (S220). When the number of distributions is 1, the processor 100 may determine that a distribution of the defect occurrence time data corresponds to a first defect distribution type (S240). When the number of distributions is 2, the processor 100 may distinguish a distribution type according to the type of distributions. When the gradient (shape$_1$) of the first distribution is greater than the gradient (shape$_2$) of the second distribution, the processor 100 may determine that a distribution of the defect occurrence time data corresponds to a second defect distribution type (S250). When the gradient (shape$_1$) of first distribution is less than the gradient (shape$_2$) of the second distribution, the processor 100 may determine that a distribution of the defect occurrence time data corresponds to a third defect distribution type (S260). The first defect distribution type (S240), the second defect distribution type (S250), and the third defect distribution type (S260) are described below with reference to FIG. 7.

The processor 100 according to some example embodiments of inventive concepts may adopt different defect prediction methods according to the distinguished defect distribution type. The processor 100 may predict a wafer defect based on the lifetime of the wafer with respect to the first defect distribution type (S240) and the second defect distribution type (S250) (S270). The processor 100 may predict a wafer defect based on a wafer extrinsic defect rate with respect to the third defect distribution type (S260) (S280).

Figure 7:
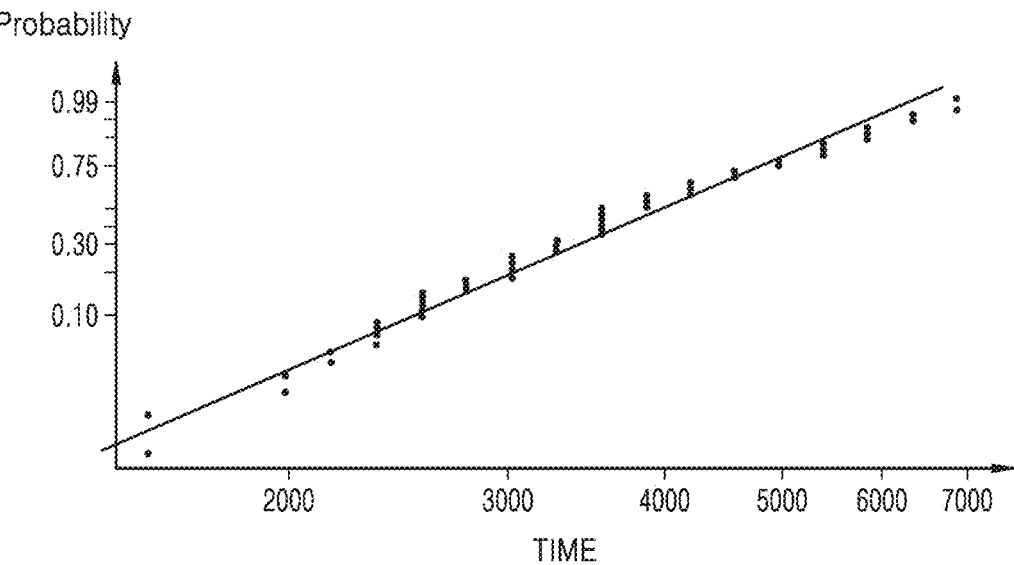
FIG. 7 is a graph of an example of a first defect distribution type.

FIG. 7 is a graph of an example of the first defect distribution type (S240).

When the number of distributions is one (1) as a distribution estimation result, the processor 100 may determine that a distribution of the defect occurrence time data corresponds to the first defect distribution type (S240). For example, in FIG. 7, the first defect distribution type (S240) may be or correspond to a type in which the characteristics of the extrinsic defect and the robust intrinsic defect are not observed, and only the characteristics of the intrinsic defect are observed in the defect occurrence time data.

For example, in the first defect distribution type (S240), the goodness of fit (GoF) of the defect occurrence time data may be higher when the processor 100 divides the defect occurrence time data into one distribution and matches the distribution to the Weibull distribution, than when the processor 100 divides the defect occurrence time data into two or three distributions and matches each distribution to the separate Weibull distributions. In this case, the processor 100 may predict a wafer defect by calculating the lifetime of the wafer based on the shape parameter of an intrinsic defect distribution.

Figure 8A:
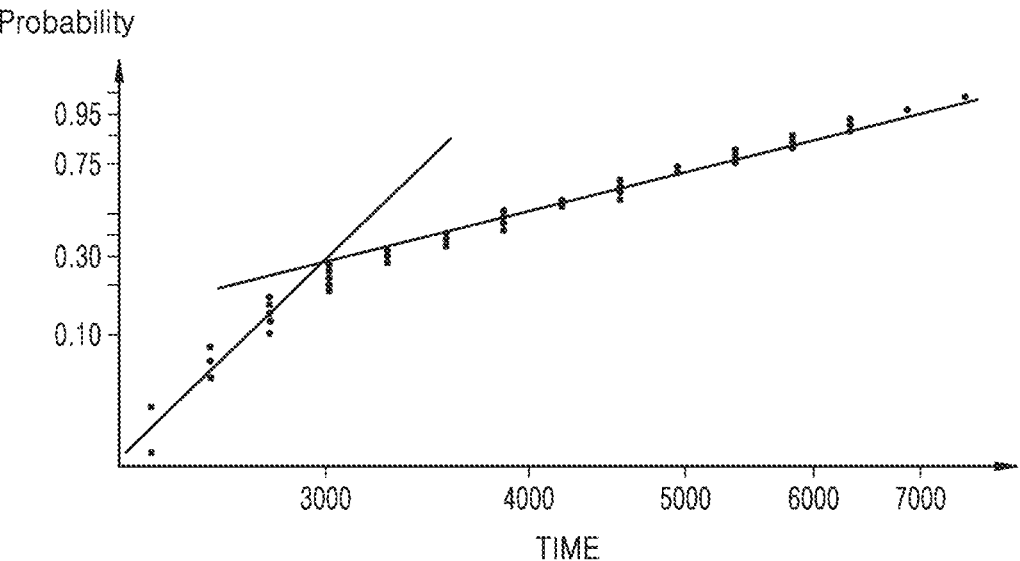
FIGS. 8A and 8B are graphs of an example of a second defect distribution type.
Figure 8B:
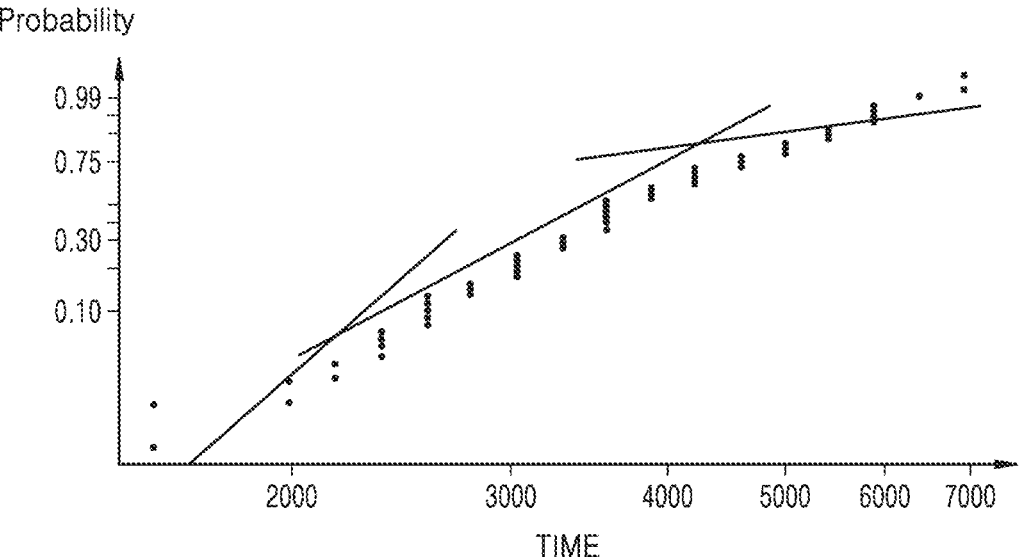

FIGS. 8A and 8B are graphs of an example of the second defect distribution type (S250).

When the number of distributions is greater than or equal to 2 as a distribution estimation result, the gradient (slope) of the first distribution is greater than the gradient (slope) of the second distribution, the processor 100 may determine that a distribution of the defect occurrence time data corresponds to the second defect distribution type (S250).

For example, in FIG. 8A, the second defect distribution type (S250) may be or correspond to a type in which the characteristics of the intrinsic defect and the robust intrinsic defect are observed in the defect occurrence time data. FIG. 8A illustrates a case in which the goodness of fit (GoF) of the defect occurrence time data may be higher when the processor 100 divides the defect occurrence time data into two distributions, and matches each distribution to a Weibull distribution, than when the processor 100 divides the defect occurrence time data into one or three distributions and matches each distribution to Weibull distributions.

For example, referring to FIG. 8B, the second defect distribution type (S250) may be or correspond to a type in which all of the characteristics of the extrinsic defect, the intrinsic defect, and the robust intrinsic defect are observed in the defect occurrence time data. FIG. 8B illustrates a case in which the goodness of fit of the defect occurrence time data may be higher when the processor 100 divides the defect occurrence time data into three distributions and matches each distribution to the Weibull distribution, than when the processor 100 divides the defect occurrence time data into one or two distributions and matches each distribution to the Weibull distribution.

The second defect distribution type (S250) may be or correspond to a case in which the gradient (slope of failure probability with respect to time) of the first distribution indicating the characteristics of the extrinsic defect is greater than the gradient (slope of failure probability with respect to time) of the second distribution indicating the characteristics of the intrinsic defect, for example, a wafer or a die or a packaged device is characteristically weak to the intrinsic defect. Accordingly, the processor 100 may improve accuracy of prediction of a wafer defect by calculating the lifetime of a wafer or a lifetime of a semiconductor device fabricated on a wafer with respect to the second defect distribution type (S250) based on the scale parameter of the intrinsic defect distribution.

Figure 9A:
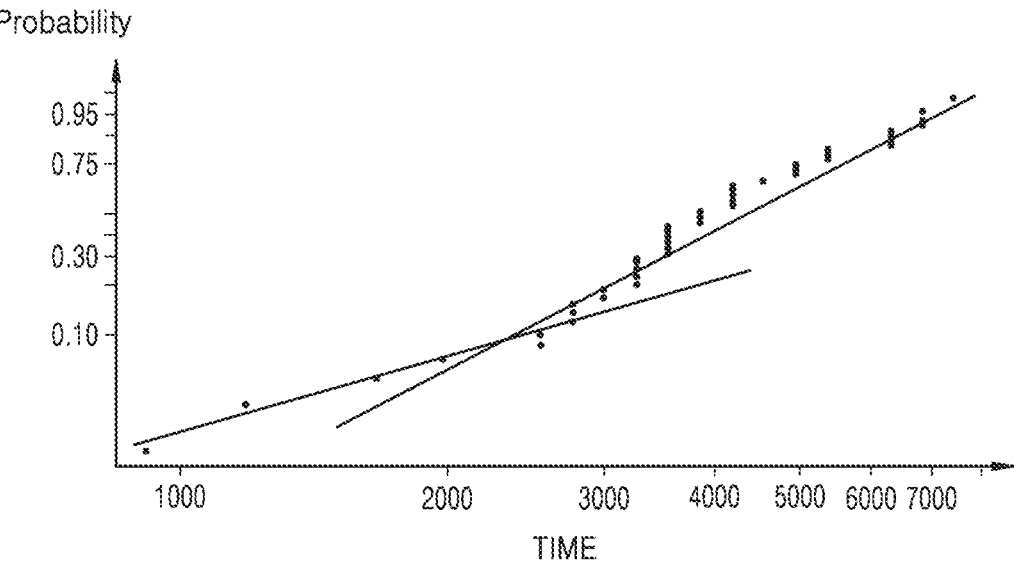
FIGS. 9A, 9B, and 9C are graphs of an example of a third defect distribution type.
Figure 9B:
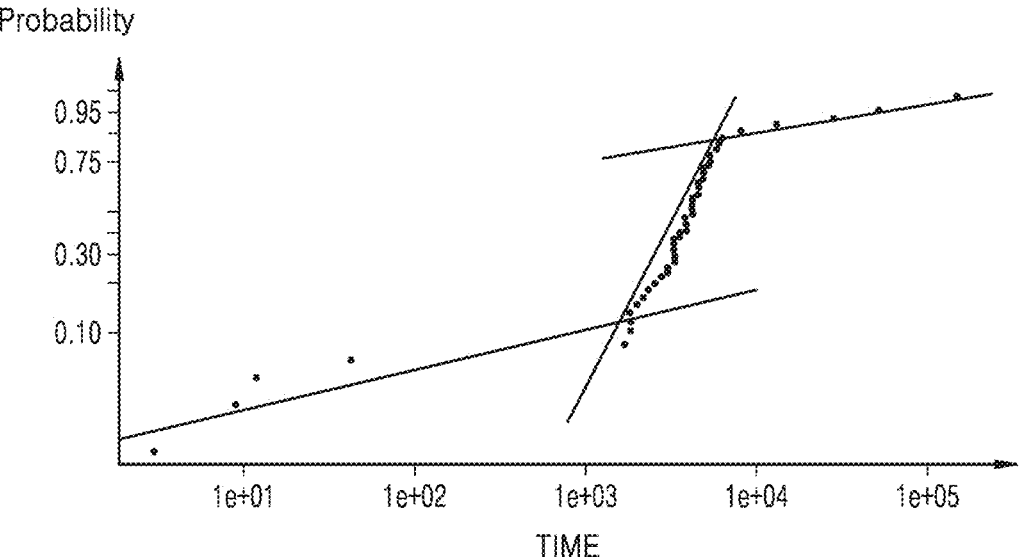
Figure 9C:
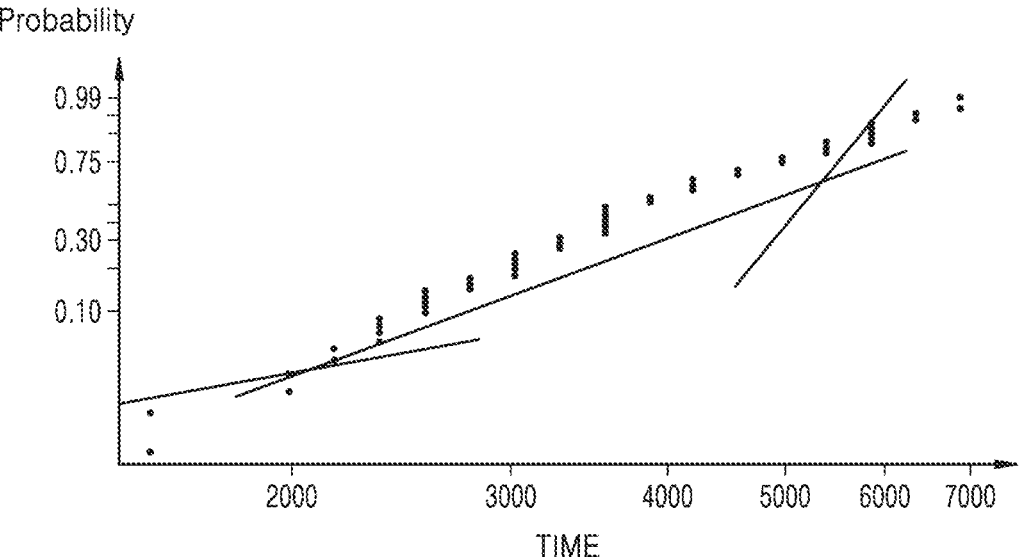

FIGS. 9A, 9B, and 9C are graphs of an example of the third defect distribution type (S260).

The processor 100 may determine that a distribution of the defect occurrence time data corresponds to the third defect distribution type (S260), when the number of distributions is greater than or equal to 2 as a distribution estimation result and the gradient of the first distribution is less than the gradient of the second distribution.

For example, referring to FIG. 9A, the third defect distribution type (S260) may be or correspond to a type in which the characteristics of the extrinsic defect and the intrinsic defect are observed in the defect occurrence time data. FIG. 9A illustrates a case in which the goodness of fit of the defect occurrence time data is higher when the processor 100 divides the defect occurrence time data into two distributions and matches each distribution to the Weibull distribution, than when the processor 100 divides the defect occurrence time data into one or three distributions and matches each distribution to the Weibull distribution.

For example, referring to FIG. 9B, the third defect distribution type (S260) may be or correspond to a type in which the characteristics of the extrinsic defect, the intrinsic defect, and the robust intrinsic defect are observed in the defect occurrence time data. FIG. 9B illustrates a case in which the goodness of fit of the defect occurrence time data is higher when the processor 100 divides the defect occurrence time data into three distributions and matches each distribution to the Weibull distribution, than when the processor 100 divides the defect occurrence time data into one or two distributions and matches each distribution to the Weibull distribution.

For example, referring to FIG. 9C, the third defect distribution type (S260) may be or correspond to a type in which the characteristics of the extrinsic defect, the intrinsic defect, and the robust intrinsic defect are observed in the defect occurrence time data. FIG. 9C illustrates a case in which the goodness of fit of the defect occurrence time data is higher when the processor 100 divides the defect occurrence time data into three distributions and matches each distribution to the Weibull distribution, than when the processor 100 divides the defect occurrence time data into one or two distributions and matches each distribution to the Weibull distribution.

The third defect distribution type (S260) may be or correspond to a case in which the gradient of the first distribution indicating the characteristics of the extrinsic defect is less than the gradient of the second distribution indicating the characteristics of the intrinsic defect, that is, a wafer is characteristically weak to the extrinsic defect. Accordingly, the processor 100 may improve accuracy of prediction of a wafer defect by predicting the extrinsic defect rate of a wafer based on the shape parameter of the extrinsic defect distribution with respect to the third defect distribution type (S260).

Figure 10:
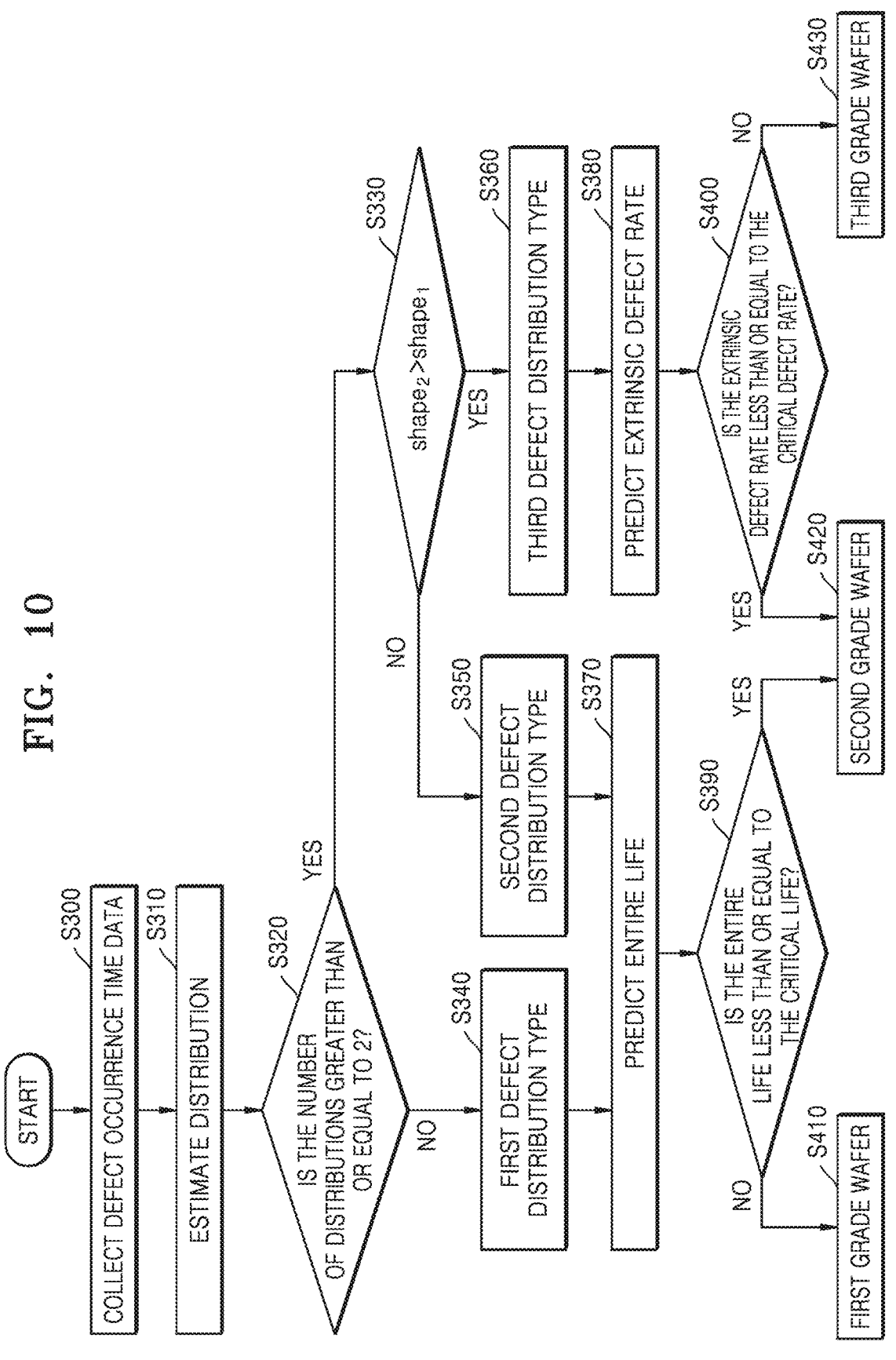
FIG. 10 is a flowchart of a method of determining the grade of a wafer according to classification of a defect distribution type.

FIG. 10 is a flowchart of a method of determining the grade, e.g. the production grade or the quality grade or the reliability grade, of a wafer according to classification of a defect distribution type.

The grade of the wafer may be used to determine an amount of a premium associated with semiconductor devices fabricated on the wafer. For example, a high grade wafer may include highly reliable semiconductor devices, e.g. devices having a large expected lifetime and a reduced amount of intrinsic defects. A low grade wafer may include less reliable semiconductor devices, e.g. may include devices having a low expected lifetime and an increased amount of intrinsic defects. Wafers may be dispositioned based on the wafer grade. Depending on the wafer grade, some wafers may be identified as having semiconductors with a high lifetime, and may be used for some products, while some other wafers may be identified as having semiconductors with a low expected lifetime, and may be used for other products or may be scrapped.

Referring to FIG. 10, the processor 100 may distinguish a defect distribution type according to the estimated number of distributions and the shape of a distribution. The processor 100 may predict water defect information by calculating the lifetime or the extrinsic defect rate according to the distinguished defect distribution type. For example, the processor 100 may predict wafer defect information based on the lifetime with respect to a first defect distribution type (S340) and a second defect distribution type (S350) (S370), and may predict wafer defect information based on an extrinsic defect rate with respect to a third defect distribution type (S360) (S380).

The processor 100 may classify the first defect distribution type (S340) and the second defect distribution type (S350) as a first grade wafer (S410) when the lifetime is greater than a certain lifetime such as a critical life (S390-N) and as a second grade wafer (S420) when the lifetime is less than or equal to the critical life (S390-Y). The critical life may have a different value for each semiconductor product and/or for each application and/or for each customer or consumer.

The third defect distribution type (S360) may be classified into the second grade wafer (S420) when the extrinsic defect rate is less than or equal to the first/critical defect rate (S400-Y) and into a third grade wafer (S430) when the extrinsic defect rate is greater than the critical defect rate (S400-N).

Figure 11:
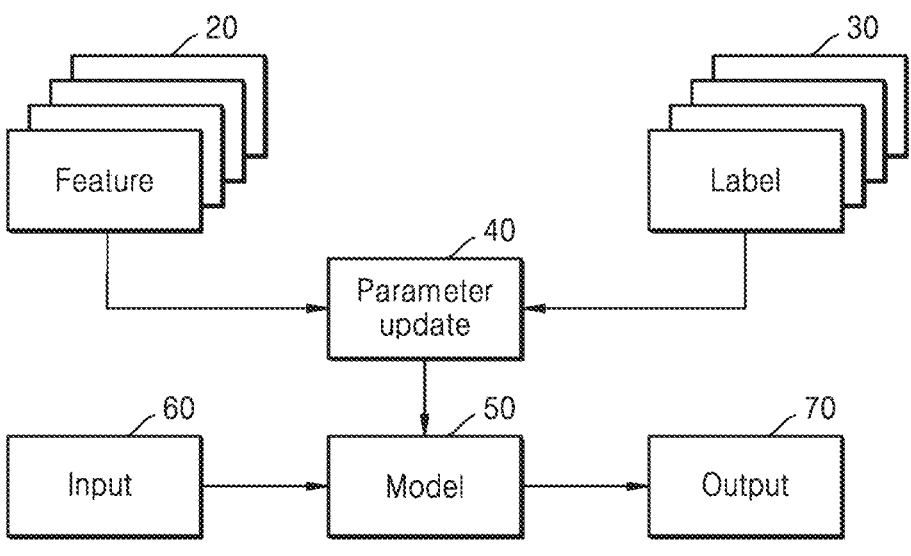
FIG. 11 is a block diagram of a method of operating a machine learning unit of FIG. 1.

FIG. 11 is a block diagram of a method of operating the machine learning unit 120 of FIG. 1.

Referring to FIGS. 1 and 11 together, the device 10 for predicting a wafer defect may include the machine learning unit 120.

The machine learning unit 120 may generate a wafer defect information prediction model through learning, and the defect prediction unit 130 may predict wafer defect information based on the generated wafer defect information prediction model. For example, the wafer defect information prediction model may be configured with a plurality of parameters, and the machine learning unit 120 may generate the wafer defect information prediction model through a learning process of improving or optimizing the parameters based on training data. For example, wafer the defect information prediction model may include a plurality of inference layers, and the machine learning unit 120 may generate the wafer defect information prediction model by updating the parameters with respect to each layer based on the training data.

The machine learning unit 120 may update (40) the parameters of a wafer defect information prediction model 50 by receiving an input variable (feature) 20 and an output variable (label) 30, as training data. The input variable 20 of the machine learning unit 120 according to some example embodiments of inventive concepts may be a distribution estimation result that is output from the distribution estimation unit 110. For example, the machine learning unit 120 may receive a plurality of training data including the input variable 20 and the output variable 30, and update the parameters of the layers so that the output variable 30 may be generated through a plurality of operation processes with respect to the input variable 20 of training data.

A model generated by the machine learning unit 120 may be a model for predicting whether a wafer defect occurs. A wafer defect occurrence prediction model may be a machine learning model that is trained by receiving training data regarding whether a wafer defect occurs, as the output variable 30. The wafer defect occurrence prediction model may predict whether a wafer defect occurs, as output data 70, with respect to new input data 60. The wafer defect occurrence prediction model may use at least one of a random forest, a decision tree, a support vector machine (SVM), or a logistic regression model.

A model generated by the machine learning unit 120 may be or correspond to a model for predicting the extrinsic defect rate of a wafer. The wafer extrinsic defect rate prediction model may be a machine learning model that is trained by receiving training data having the extrinsic defect rate of a wafer as the output variable 30. The wafer extrinsic defect rate prediction model may predict the extrinsic defect rate of a wafer as the output data 70 with respect to the new input data 60. The wafer extrinsic defect rate prediction model may use a multiple regression and/or a support vector regression (SVR) model.

FIG. 12 illustrates an example of training data of the machine learning unit 120 of FIG. 1.

Referring to FIGS. 1 and 12 together, the machine learning unit 120 of the device 10 for predicting a wafer defect may learn from a shape parameter, a scale parameter, a weight, and a likelihood of each distribution, as input variables, among a distribution estimation result output from the distribution estimation unit 110.

The shape parameter and scale parameter of each distribution may be or correspond to characteristics indicating a life distribution, and the weight of each distribution may indicate a ratio of the number of defect occurrence time data included in each distribution. The likelihood of each distribution may indicate a probability of a sample to be observed from the estimated distribution.

In some example embodiments illustrated in FIG. 12, the input variable may correspond to an x value, and $\alpha_1$, $\alpha_2$, and $\alpha_3$ may indicate the scale parameters of the first distribution, the second distribution, and the third distribution. $\beta_1$, $\beta_2$, and $\beta_3$ may indicate the shape parameters of the first distribution, the second distribution, and the third distribution, and $\lambda_1$, $\lambda_2$, and $\beta_3$ may indicate the weight of the first distribution, the second distribution, and the third distribution. $L \cdot L_1$, $L \cdot L_2$, and $L \cdot L_3$ may indicate the likelihood of each distribution.

The machine learning unit 120 of the device 10 for predicting a wafer defect may learn from whether a wafer defect occurs and the extrinsic defect rate of a wafer, as output variables. In the embodiment of FIG. 12, the output variables may correspond to a y value.

FIG. 13 is a table showing an example of a method of predicting a wafer defect based on the lifetime.

The processor 100 according to some example embodiments of inventive concepts may distinguish a defect distribution type according to a distribution of defect occurrence time data, and calculate the lifetime when the defect occurrence time data follows some defect distribution type.

The processor 100 may estimate the lifetime from an intrinsic defect distribution. For example, the processor 100 may estimate the lifetime from the distribution of FIG. 8A or the first distribution of FIG. 8B. The processor 100 may estimate the lifetime based on the scale parameter of the intrinsic defect distribution.

As in some example embodiments of FIG. 13, the lifetime may be calculated by percentage by collecting defect information for each wafer, and then a confidence interval thereof may be calculated. For example, in FIG. 13, a wafer defect may be estimated by estimating that a time when 1% of the total products following the Weibull distribution breaks down is year 3032.

Any of the elements and/or functional blocks disclosed above may include or be implemented in processing circuitry such as hardware including logic circuits; a hardware/ software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While inventive concepts have been particularly shown and described with reference to some example embodiments thereof, it will be understood that various changes in form and details may be made therein without departing from the spirit and scope of the following claims.

What is claimed is:

1. A method of predicting wafer defect information, the method comprising:
   estimating a distribution with respect to defect occurrence time data, the defect occurrence time data including information about a time associated with a wafer defect occurrence in a wafer;
   classifying types of defects occurring in the wafer using the estimated distribution, wherein classifying the types of defects occurring in the wafer comprises:
      fitting different portions of the estimated distribution using a plurality of distributions, wherein each of the plurality of distributions has a different gradient; and
      for each portion of the estimated distribution, classifying the corresponding type of defect based on the gradient of the corresponding distribution;

outputting wafer defect information predicted according to the classified types of defects; and
   fabricating a semiconductor device using the wafer or dispositioning the wafer depending on the wafer defect information.

2. The method of claim 1, wherein the estimating of the distribution comprises:
   dividing the defect occurrence time data into k distributions based on a goodness of fit (GoF) between a distribution of the defect occurrence time data and a probability distribution; and
   outputting the probability distribution corresponding to each of the k distributions,
   wherein k is an integer greater than or equal to 1.

3. The method of claim 1, wherein the outputting of the wafer defect information comprises outputting wafer defect information predicted from at least one of a lifetime or an extrinsic defect rate.

4. The method of claim 2, wherein classifying the types of defects occurring in the wafer further comprises distinguishing the type of defect based on at least one of a shape of the k distributions or a k value.

5. The method of claim 2, further comprising:
   predicting wafer defect information based on lifetime of a wafer with respect to a first defect distribution type, wherein k is 1.

6. The method of claim 2, wherein classifying the types of defects occurring in the wafer further comprises:
   classifying the types of defects, in response to a case where k is greater than or equal to 2 by comparing a gradient of a first distribution with a gradient of a second distribution,
   wherein the first distribution is based on defect occurrence time having at least one defect occurrence time earlier than at least one defect occurrence time of the second distribution.

7. The method of claim 6, further comprising:
   predicting wafer defect information based on a lifetime of a wafer,
   wherein the predicting the wafer defect information is with respect to a second defect distribution type in which a gradient of the first distribution is greater than a gradient of the second distribution.

8. The method of claim 6, further comprising:
   predicting wafer defect information based on an extrinsic defect rate of a wafer,
   wherein the predicting the wafer defect information is with respect to a third defect distribution type in which the gradient of the first distribution is less than the gradient of the second distribution.

9. The method of claim 2, wherein the probability distribution comprises a Weibull distribution.

10. The method of claim 9, wherein the gradient of a first distribution and the gradient of a second distribution correspond to a shape parameter of the Weibull distribution.

11. A method of predicting wafer defect information, the method comprising:
   estimating a distribution with respect to defect occurrence time data including information about a time associated with an occurrence of the wafer defect in a wafer;
   classifying types of defects occurring in the wafer using the estimated distribution, wherein classifying types of defects comprises:
      fitting different portions of the estimated distribution using a plurality of distributions, wherein each of the plurality of distributions has a different gradient; and for each portion of the estimated distribution, classifying the corresponding type of defect based on the gradient of the corresponding distribution;

outputting the wafer defect information by using a wafer defect prediction model according to the classified types of defects; and fabricating a semiconductor device using the wafer or dispositioning the wafer depending on the wafer defect information.

12. The method of claim 11, wherein the estimating of the distribution comprises:

dividing the defect occurrence time data into k distributions based on a goodness of fit (GoF) between a distribution of the defect occurrence time data and a probability distribution; and outputting the probability distribution corresponding to each of the k distributions, wherein k is an integer greater than or equal to 1.

13. The method of claim 11, wherein the wafer defect prediction model is based on machine learning, wherein for each distribution, the machine learning is based on values of a shape parameter, a scale parameter, a weight, and a likelihood.

14. The method of claim 11, wherein the wafer defect prediction model predicts at least one of whether a defect occurs for each wafer or an extrinsic defect rate for each wafer.

15. A device for predicting wafer defect information by using a processor, the device comprising:

processing circuitry configured to:

estimate a distribution with respect to defect occurrence time data including information about a time associated with a wafer defect occurrence in a wafer, classify types of defects occurring in the wafer using the estimated distribution, wherein classifying types of defects comprises:

fitting different portions of the estimated distribution using a plurality of distributions, wherein each of the plurality of distributions has a different gradient, and for each portion of the estimated distribution, classifying the corresponding type of defect based on the gradient of the corresponding distribution, classify a grade of the wafer based on the classified types of defects, and fabricate a semiconductor device using the wafer or dispositioning the wafer depending on the classified grade.

16. The device of claim 15, wherein the processing circuitry is further configured to divide the defect occurrence time data into k distributions based on a goodness of fit (GoF) between a distribution of the defect occurrence time data and a probability distribution, and to output the probability distribution corresponding to each of the k distributions, wherein k is an integer greater than or equal to 1.

17. The device of claim 15, wherein the processing circuitry is further configured to output wafer defect information predicted from at least one of lifetime or an extrinsic defect rate.

18. The device of claim 16, wherein the processing circuitry is further configured to generate a wafer defect prediction model by updating parameters of a machine learning model based on training data, the training data having information about the k distributions included in the distribution estimation result as input variables, and having a wafer defect occurrence information and an extrinsic defect rate as output variables.

19. The device of claim 18, wherein the processing circuitry is further configured to classify the wafer to be a second grade wafer in response to the extrinsic defect rate of the wafer predicted through the machine learning model being less than or equal to a first defect rate.

20. The device of claim 17, wherein the processing circuitry is further configured to classify the wafer to be a first grade wafer in response to the lifetime of the wafer being greater than a first defect rate.

* * * * *